(12) United States Patent
Altschul et al.

(10) Patent No.: US 6,405,031 B1
(45) Date of Patent: Jun. 11, 2002

(54) WIRELESS TELEPHONE SYSTEM, TELEPHONE AND METHOD

(75) Inventors: Randice-Lisa Altschul, Cliffside Park; Lee S. Volpe, Collingswood, both of NJ (US)

(73) Assignee: Dieceland Technologies Corp., Cliffside Park, NJ (US)

( * ) Notice: Subject to any disclaimer, the term of this patent is extended or adjusted under 35 U.S.C. 154(b) by 0 days.

(21) Appl. No.: 09/222,136

(22) Filed: Dec. 29, 1998

Related U.S. Application Data

(63) Continuation-in-part of application No. 08/844,149, filed on Apr. 18, 1997, now Pat. No. 5,875,393, which is a continuation-in-part of application No. 08/808,339, filed on Feb. 28, 1997, now Pat. No. 5,845,218.

(51) Int. Cl.⁷ .................................................. H04Q 7/32
(52) U.S. Cl. ........................ 455/411; 455/407; 455/565; 380/247
(58) Field of Search ............................. 455/405, 406, 455/407, 409, 410, 411, 550, 565, 575, 90, 435; 380/247–250

(56) References Cited

U.S. PATENT DOCUMENTS

| | | |
|---|---|---|
| 3,052,823 A | 9/1962 | Anderson et al. |
| 4,210,870 A | 7/1980 | Kallio-Könnö |
| 4,755,911 A | 7/1988 | Suzuki |
| 4,776,000 A | 10/1988 | Parienti |
| 4,783,799 A | 11/1988 | Maass |
| 4,794,636 A * | 12/1988 | Sanglier et al. ............. 455/410 |
| 4,831,647 A | 5/1989 | D'Avello et al. |
| 4,856,046 A | 8/1989 | Streck et al. |
| 4,881,254 A | 11/1989 | Hollowed et al. |
| 4,916,441 A | 4/1990 | Gombrich |
| 4,951,308 A | 8/1990 | Bishop et al. |
| 5,138,650 A | 8/1992 | Stahl et al. |
| 5,161,250 A | 11/1992 | Ianna et al. |
| 5,220,593 A | 6/1993 | Zicker et al. |
| 5,225,969 A | 7/1993 | Takaya et al. |
| 5,233,642 A | 8/1993 | Renton |
| D340,714 S | 10/1993 | Hoffman |
| 5,301,223 A | 4/1994 | Amadon et al. |
| 5,327,482 A | 7/1994 | Yamamato |
| 5,359,182 A | 10/1994 | Schilling |
| 5,365,570 A | 11/1994 | Boubelik |
| 5,376,931 A | 12/1994 | Marrs |
| 5,379,193 A | 1/1995 | Gall et al. |
| 5,388,148 A | 2/1995 | Seiderman |
| 5,390,245 A * | 2/1995 | Dent et al. .................. 380/247 |
| 5,438,612 A | 8/1995 | Norimatsu |
| 5,461,664 A | 10/1995 | Cappadona |
| D369,167 S | 4/1996 | Hanson et al. |
| 5,504,808 A | 4/1996 | Hamrick, Jr. |
| 5,509,196 A | 4/1996 | Davis et al. |
| 5,511,114 A | 4/1996 | Stimson et al. |
| 5,517,555 A | 5/1996 | Amadon et al. |
| 5,541,985 A | 7/1996 | Ishii et al. |
| 5,550,897 A | 8/1996 | Seiderman |
| 5,558,928 A | 9/1996 | DiStefano et al. |
| 5,563,934 A | 10/1996 | Eda |
| 5,577,100 A | 11/1996 | McGregor et al. |

(List continued on next page.)

FOREIGN PATENT DOCUMENTS

WO    WO-96/03001    *    2/1996

*Primary Examiner*—Lester G. Kincaid
(74) *Attorney, Agent, or Firm*—Arthur Jacob

(57) ABSTRACT

A wireless telephone system, a wireless telephone for use in the system, and a method of using a wireless telephone capable of use for telephonic communications only for a predetermined limited period, within which limited period the sum of the durations of the telephonic communications reach the duration of the limited period, after which limited period the telephone is rendered inoperative, all utilize the transmission of an encrypted signal together with the transmission of selected telephonic communications to deter unauthorized use of the predetermined limited period.

14 Claims, 6 Drawing Sheets

U.S. PATENT DOCUMENTS

| | | |
|---|---|---|
| 5,577,109 A | 11/1996 | Stimson et al. |
| 5,579,379 A | 11/1996 | D'Amico et al. |
| 5,583,918 A | 12/1996 | Nakagawa |
| 5,586,167 A * | 12/1996 | Handforth .................. 455/410 |
| 5,592,537 A | 1/1997 | Moen |
| 5,608,778 A | 3/1997 | Partridge, III |
| 5,615,087 A | 3/1997 | Wieloch |
| 5,615,260 A | 3/1997 | Kurgan |
| 5,621,787 A | 4/1997 | McKoy et al. |
| 5,625,669 A | 4/1997 | McGregor et al. |
| 5,627,886 A | 5/1997 | Bowman |
| 5,629,977 A | 5/1997 | Fonseca |
| 5,673,306 A | 9/1997 | Amadon et al. |
| 5,673,309 A | 9/1997 | Woynoski et al. |
| 5,675,636 A | 10/1997 | Gray |
| 5,677,945 A | 10/1997 | Mullins et al. |
| 5,684,861 A | 11/1997 | Lewis et al. |
| 5,706,330 A * | 1/1998 | Bufferd et al. .............. 455/405 |
| 5,815,807 A * | 9/1998 | Osmani et al. ............. 455/410 |

* cited by examiner

WIRELESS TELEPHONE SYSTEM, TELEPHONE AND METHOD

This is a continuation-in-part of application Ser. No. 08/844,149, filed Apr. 18, 1997, now U.S. Pat. No. 5,875,393, which is a continuation-in-part of application Ser. No. 08/808,339, filed Feb. 28, 1997, now U.S. Pat. No. 5,845,218.

The present invention relates generally to telephonic communications and pertains, more specifically, to a wireless telephone system, a wireless telephone and a method for facilitating the use of wireless telephones.

The increasing popularity of wireless telephones, prompted by the widespread availability of cellular wireless telephone services, has led to a demand for more convenience and greater availability in wireless telephones and more economical wireless telephone use. The present invention places wireless telephone services within the easy reach of a greater population, thereby facilitating telephonic communication among increased numbers of people, in business and commercial fields as well as in domestic and personal uses.

It is well known that only a limited amount of radio frequencies are allotted for commercial wireless telephone communications. A growing problem in the provision of wireless telephone service is the unauthorized use of an assigned telephone number on an assigned carrier frequency. The practice, commonly referred to as "cloning", enables an unauthorized user to duplicate an assigned telephone number and actually "steal" airtime in the wireless telephone system. Currently, commercial carriers employ a relatively complex and expensive computer tracking infrastructure to counter such cloning by identifying and authenticating a specific telephone and details of the corresponding telephone account before any particular telephone communication is qualified and allowed to proceed on the carrier's system. Then the telephone call is tracked, timed and invoiced automatically. The present invention provides a wireless telephone system, a wireless telephone for use in the system, and a method of using a wireless telephone which combats cloning, thereby deterring unauthorized use of airtime, and does so with less complexity and greatly reduced cost.

Thus, the present invention provides a wireless telephone and method, as well as a wireless telephone system, for facilitating the use of wireless telephones. As such, the present invention attains several objects and advantages, some of which may be summarized as follows: Simplifies and renders more economical the use of wireless telephone services; renders wireless telephone services available to a larger audience at lowered cost; facilitates the distribution and use of wireless telephones; reduces the expense of wireless telephones and wireless telephone services; promotes the use of wireless telephones and wireless telephone services by those who otherwise would not invest in a wireless telephone and expend funds for wireless telephone services; facilitates the availability of wireless telephones and wireless telephone services for emergency uses; provides added convenience in obtaining as well as using wireless telephones and wireless telephone services.

The above object and advantages, as well as further objects and advantages, are attained by the present invention which may be described briefly as a wireless telephone system including a wireless telephone capable of use for telephonic communication only during a limited period, after which period the telephone is rendered inoperative for telephonic communication in the telephone system, the telephone comprising: telephonic means for transmitting and receiving telephonic communications; enabling/disabling means for enabling the telephonic means for telephonic communications during the limited period and disabling the telephonic means for telephonic communications upon expiration of the limited period, whereby the telephone is rendered inoperative beyond the limited period; selective operating means for operating the telephonic means for selected telephonic communications of selected durations, the enabling/disabling means being responsive to the selective operating means such that telephonic communication is disabled for telephonic communications when the sum of the selected durations reaches the limited period; and encrypted signal means for transmitting an encrypted signal during telephonic communications through the telephonic means; the telephone system including encrypted signal reading means remote from the telephone for maintaining the telephonic communication through the telephone system during the selected telephonic communications in response to the presence of the encrypted signal and for discontinuing telephonic communication through the telephone system in response to the absence of the encrypted signal.

Further, the present invention provides a wireless telephone for use in a telephone system including encrypted signal reading means remote from the telephone, the wireless telephone being capable of use for telephonic communication only during a limited period, after which period the telephone is rendered inoperative for telephonic communication in the telephone system, the telephone comprising: telephonic means for transmitting and receiving telephonic communications; enabling/disabling means for enabling the telephonic means for telephonic communications during the limited period and disabling the telephonic means for telephonic communications upon expiration of the limited period, whereby the telephone is rendered inoperative beyond the limited period; selective operating means for operating the telephonic means for selected telephonic communications of selected durations, the enabling/disabling means being responsive to the selective operating means such that telephonic communication is disabled for telephonic communications when the sum of the selected durations reaches the limited period; and encrypted signal means for transmitting an encrypted signal during telephonic communications through the telephonic means such that the encrypted signal reading means enables maintenance of the telephonic communication through the telephone system during the selected telephonic communications in response to presence of the encrypted signal and effects discontinuance of telephonic communication through the telephone system in response to absence of the encrypted signal.

Additionally, the present invention includes a method of using a wireless telephone for telephonic communications in a wireless telephone system during only the duration of a limited period, after which period the telephone is rendered inoperative in the telephone system, the telephone including telephonic means for transmitting and receiving telephonic communications, the method comprising: enabling the telephonic means for telephonic communications during the duration of the limited period; operating the telephonic means for telephonic communications of selected durations; disabling telephonic communication through the telephonic means upon the sum of the selected durations reaching the duration of the limited period, whereby the telephone is rendered inoperative in the telephone system beyond the limited period; transmitting an encrypted signal during telephonic communications through the telephonic means; and maintaining the telephonic communication through the telephone system during the selected telephonic communications in response to the presence of the encrypted signal and for discontinuing telephonic communication through the telephone system in response to the absence of the encrypted signal.

The invention will be understood more fully, while still further objects and advantages will become apparent, in the following detailed description of preferred embodiments of the invention illustrated in the accompanying drawing, in which.

Figure 1:
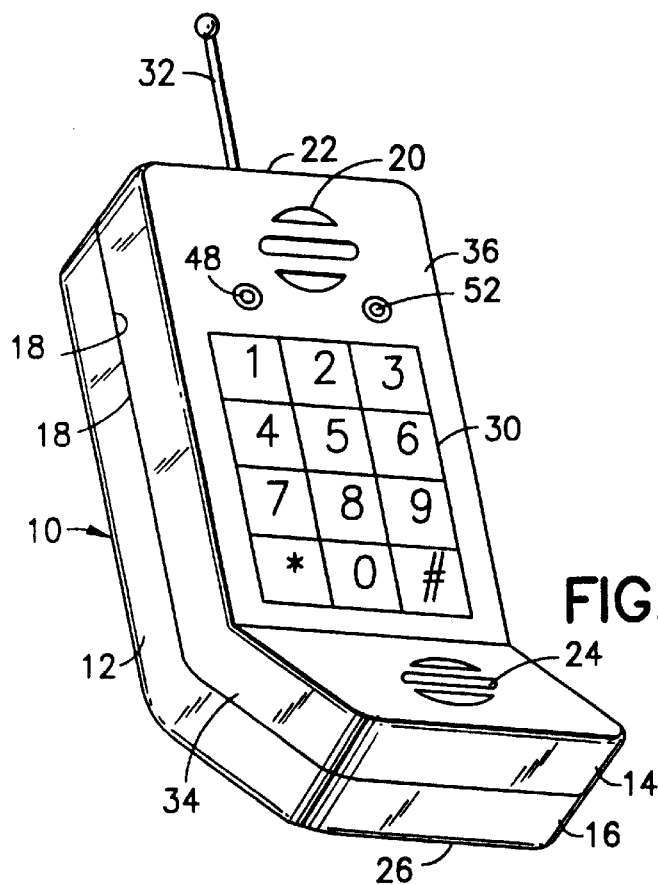
FIG. 1 is pictorial perspective view of a wireless telephone constructed in accordance with one aspect of the present invention.
Figure 2:
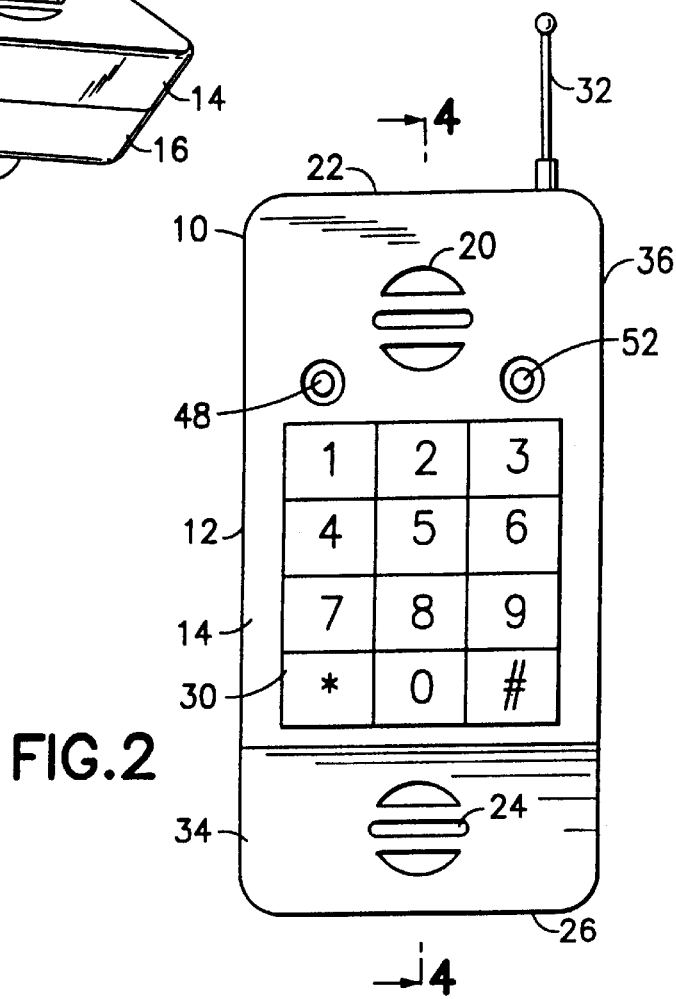
FIG. 2 is a front elevational view of the wireless telephone.
Figure 3:
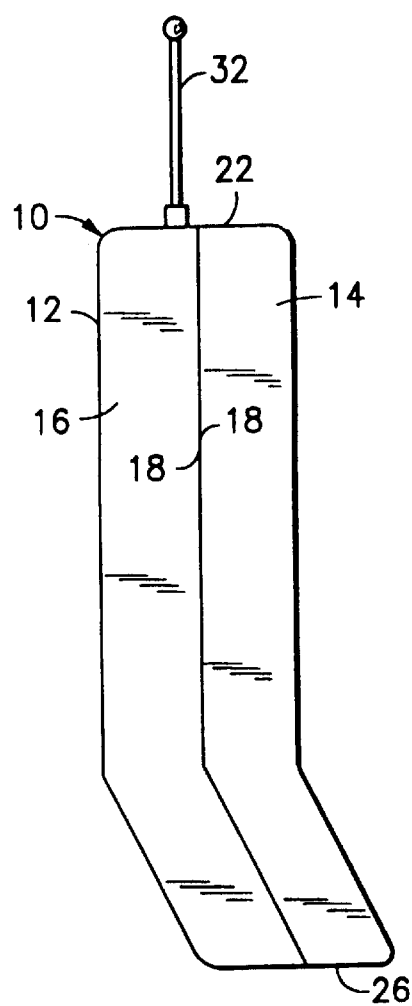
FIG. 3 is a side elevational view of the wireless telephone.

Referring now to the drawing, and especially to FIGS. 1 through 3 thereof, a wireless telephone constructed in accordance with the present invention is illustrated in the form of a disposable wireless telephone 10 and is seen to include a case 12 having a front case member 14 and a rear case member 16, joined together along abutting edges 18. An earphone grille portion 20 is located adjacent an upper end 22 of the case 12, and a microphone grille portion 24 is located adjacent a lower end 26 of the case 12. Intermediate the upper and lower ends 22 and 26 is a call destination selector, in the form of a keypad 30, and an antenna 32 extends upwardly from the upper end 22. The case 12 includes a case wall 34 which provides the telephone 10 with an overall outer configuration 36 designed for aesthetic as well as for functional purposes.

Figure 4:
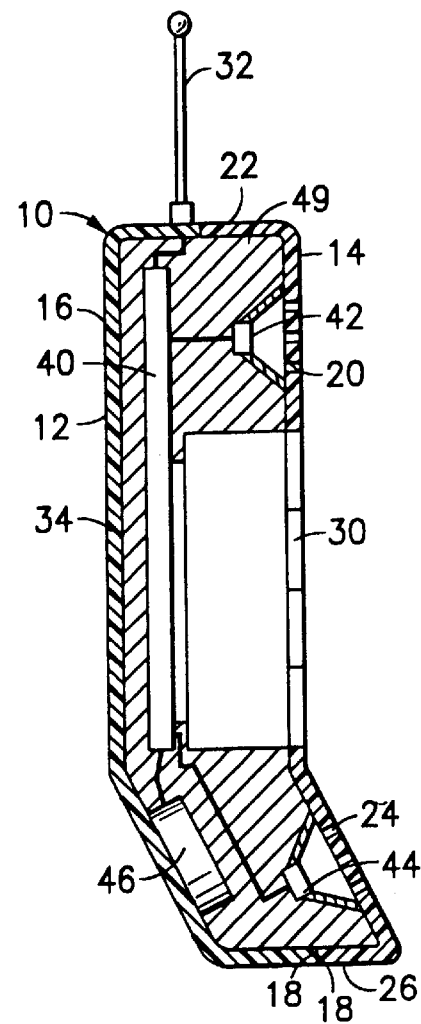
FIG. 4 is a cross-sectional view taken along line 4—4 of FIG. 2.

Turning now to FIG. 4, a circuit board 40 is located within the case 12 and is connected to an earphone 42 placed behind the earphone grille portion 20, a microphone 44 placed behind the microphone grille portion 24, the keypad 30 and the antenna 32. The electronic components of the telephone 10 are carried by the circuit board 40 and a power source in the form of a power battery 46, connected to the circuit board 40 through a power switch 48 (see FIGS. 1 and 2), provides the power necessary to operate the telephone 10. In the preferred arrangement, the case wall 34 is relatively thin and is constructed of a relatively inexpensive synthetic polymeric material, such as by vacuum forming the front case member 14 and the rear case member 16 from thin sheets of ABS or styrene, the sheets typically having a thickness of about 0.060 inch. The illustrated components then are located within the case 12 and the case 12 is closed permanently, as by welding or by adhesive bonding along the abutting edges 18 of the case members 14 and 16. Prior to sealing the case 12 closed, a matrix 49 is placed in the case 12 so that the components located within the case 12 are embedded within the matrix 49 and cannot be accessed without destruction of the working arrangement of component parts. Additionally, the matrix 49 serves as a filler which mechanically reinforces the relatively thin wall 34 of the case 12. The matrix 49 preferably is constructed of a synthetic polymeric material, such as an epoxy resin, or a mastic-like material currently available for such use. In this manner, tampering is deterred. In total, the described construction is relatively inexpensive and therefore readily expendable.

Figure 5:
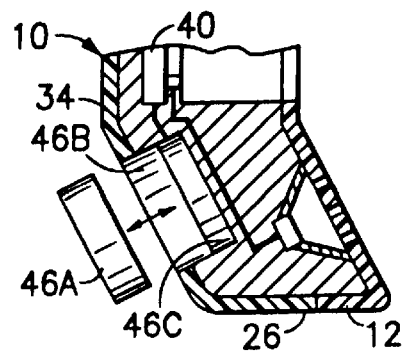
FIG. 5 is a fragment of a cross-sectional view similar to FIG. 4, but showing an alternate arrangement.

In an alternate arrangement illustrated in FIG. 5, the power source includes an external power battery 46A, rather than the internal power battery 46, the external power battery 46A being received within a receptacle 46B in the case 12 and connected to circuit board 40, through power switch 48, by means of an electrical connector 46C. In this manner, power battery 46A may be recovered for further use, while telephone 10 is discarded, or an exhausted power battery 46A may be disposed of separately, in compliance with environmental considerations.

Figure 6:
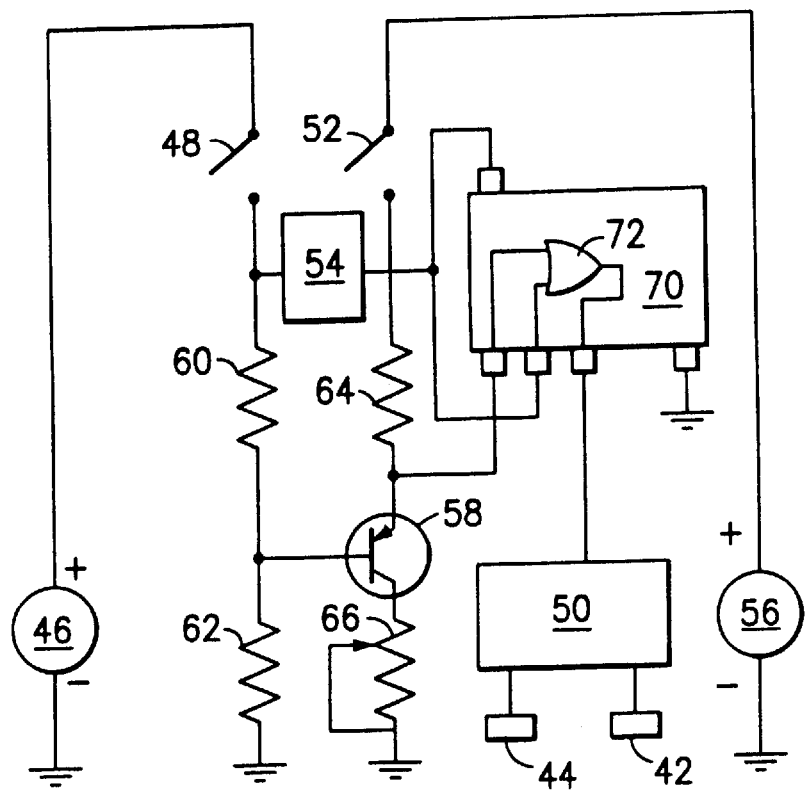
FIG. 6 is a schematic diagram showing a portion of the operating circuitry of the wireless telephone.

Telephone 10 is rendered disposable by virtue of being capable of use only for the duration of a limited period, after which period telephone 10 is inoperative and is discarded. To that end, telephone 10 includes component parts which enable only limited use and ready disposal. Referring now to FIG. 6, as well as to FIG. 4, the circuitry incorporated into telephone 10, and located primarily on circuit board 40, is shown in schematic fashion and is seen to include telephonic means in the form of conventional wireless telephone circuitry 50 for receiving and transmitting wireless telephonic communications.

Enabling/disabling means are incorporated for enabling telephonic communication for only a predetermined limited period, and disabling telephonic communication upon expiration of the predetermined limited period, whereby telephone 10 is rendered inoperative and is capable of being discarded at the end of the predetermined limited period. In the embodiment illustrated in FIG. 6, telephone 10 includes selective operating means for operating the telephonic means for telephonic communications of selected durations. Thus, the selective operating means is shown in the form of a send/receive switch 52 selectively operated by the user of the telephone 10 to send a telephonic communication when a telephone call is to be made, and to terminate the telephonic communication when the call is complete. In this instance, switch 52 is actuated manually between an "on" mode and an "off" mode to effect a telephonic communication having a duration corresponding to the time during which switch 52 is in the "on" mode. With the power switch 48 turned on, power from the power battery 46 is supplied, through a voltage regulator 54, to the wireless telephonic circuitry 50, as follows.

Setting means is utilized for determining the duration of the predetermined limited period over which the telephone 10 will be operative. In the illustrated embodiment, the setting means includes a setting battery 56 of selected, known capacity. With the power switch 48 in the "on" position and switch 52 in the "on" mode, setting battery 56 is connected to the collector of a transistor 58, and the transistor 58 is biased by the power battery 46. The choice of the values for resistors 60, 62, 64 and 66 will determine the rate of flow of current from the setting battery 56, and thus will provide a measured duration based upon the life of the setting battery 56. For example, where the setting battery 56 has a capacity of 30 mAH and the values of resistors 60, 62, 64 and 66 are chosen to draw 30 mA when switch 52 is in the "on" mode, the measured duration provided by the life of the setting battery 56 will be one hour.

An integrated circuit 70 provides an AND gate 72 interposed between the voltage regulator 54 and the telephone circuitry 50 and connected to the collector of the transistor 58 such that at the end of the measured duration provided by the life of the setting battery 56, power to the telephone circuitry will be discontinued by the AND gate 72, which serves as a disabling means, so that the telephone circuitry 50 will be disabled and telephone 10 will become inoperative. Accordingly, each time the switch 52 is placed in the "on" mode to make a telephone call, current will flow from the setting battery 56 at the selected rate. When the switch 52 is placed in the "off" mode at the end of the telephone call, the duration of the telephone call will have drained a given amount of the capacity of setting battery 56. When the sum of the durations of the telephone calls reaches the measured duration provided by the life of the setting battery 56, the telephone circuitry 50 is disabled and the telephone 10 becomes inoperative and is discarded.

Figure 7:
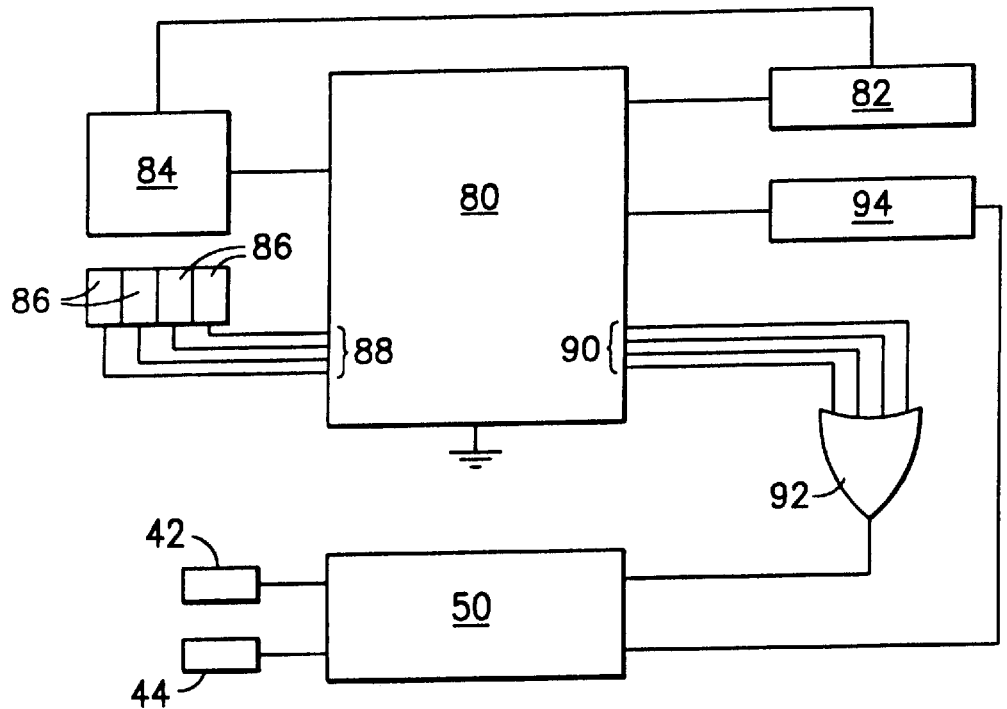
FIG. 7 is a schematic diagram showing an alternate embodiment.

In an alternate arrangement illustrated in FIG. 7, the setting means includes a timing mechanism 80 powered continuously by a power supply 82 and connected to an oscillator 84, which also is powered by the power supply 82 and supplies the timing mechanism 80 with a timing signal. Selector means, shown in the form of manually operated thumb wheels 86, enable the input of a prescribed time into the timing mechanism 80, through input terminals 88. Output terminals 90 of the timing mechanism 80 are connected to the telephone circuitry 50 through an OR gate 92. A start/stop indicator 94 is responsive to the send/receive switch 52 such that upon the initiation of a telephone call, a start signal is provided to the timing mechanism 80 and upon completion of the telephone call, a stop signal is provided to the timing mechanism 80, enabling the timing mechanism 80, in concert with the oscillator 84, to count toward the prescribed time set into the timing mechanism 80 by the thumb wheels 86, for the duration of each telephone call, and thus compare the sum of the selected durations to the prescribed time set into the timing mechanism 80. When the sum of the durations of the telephone calls reaches the prescribed time set into the timing mechanism 80, the OR gate 92, which serves as a disabling means, discontinues power to the telephone circuitry 50, so that the telephone circuitry 50 will be disabled and telephone 10 will become inoperative.

In both of the alternatives illustrated in FIGS. 6 and 7, once the setting means is set for the predetermined limited period, the setting means is embedded within the matrix 49, along with the remainder of the internal components of the telephone 10, as described above, so as to deter tampering which could alter the duration of the predetermined limited period.

Figure 8:
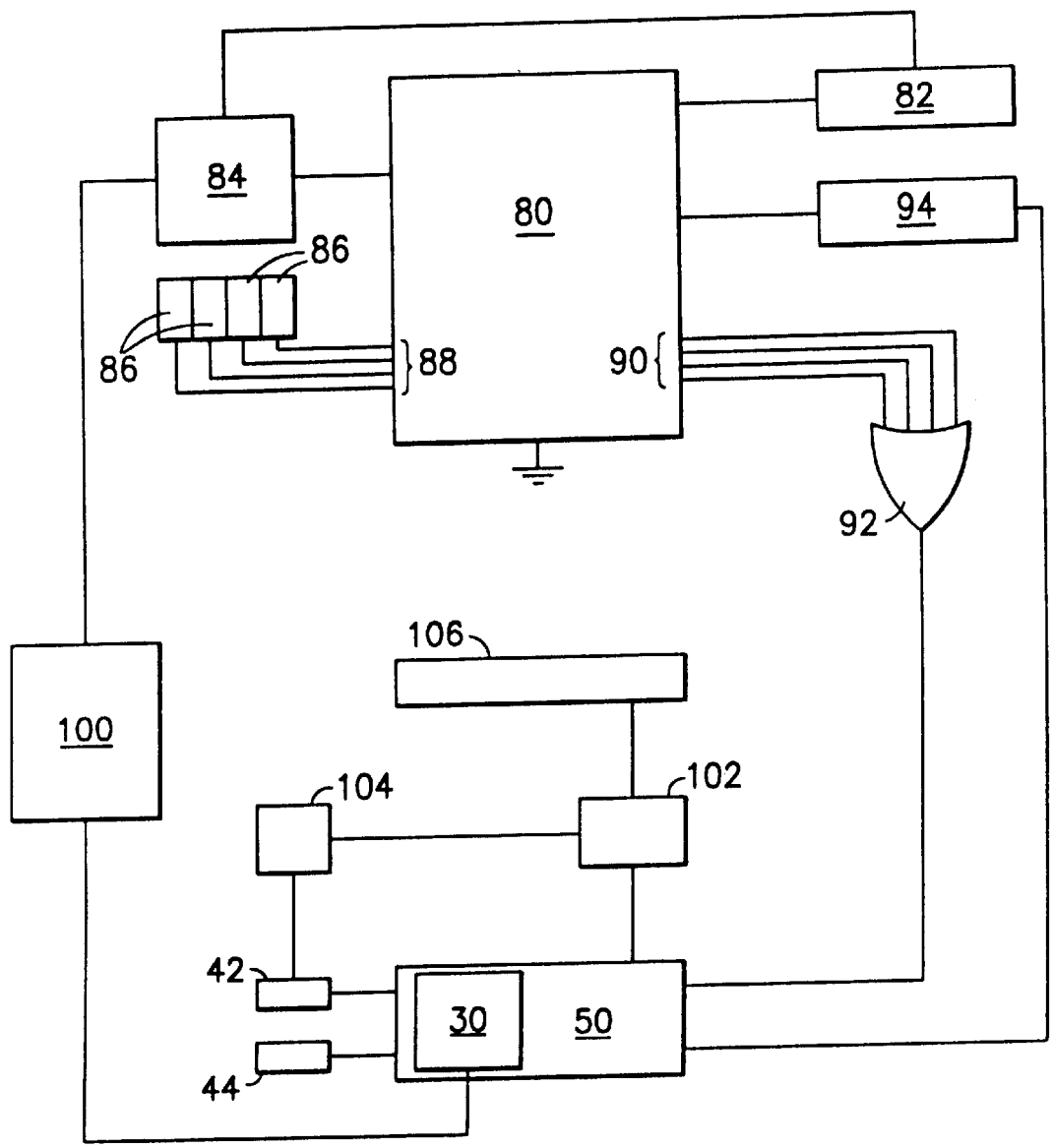
FIG. 8 is a schematic diagram showing another alternate embodiment.

The alternate arrangement illustrated in FIG. 8 enables telephone 10 to be utilized for telephone communications which are directed to different rate destinations. Since telephone rates ordinarily differ in accordance with the destination of a telephone call, such as local calls, out-of-area calls, long-distance calls and international calls, the alternate of FIG. 8 accommodates such differences. Thus, in addition to the arrangement described above, in connection with FIG. 7, a rate code means shown in the form of a rate code analyzer 100, is placed in the arrangement so as to be responsive to the keypad 30 of the telephone circuitry 50 for operating the oscillator 84 and, hence, the timing mechanism 80, at a rate determined by the destination of the telephone call selected at the keypad 30. The selector means, again shown in the form of thumb wheels 86, enable the input of a selected maximum time into the timing mechanism 80, through the input terminals 88. As before, the timing mechanism 80, in concert with the oscillator 84, counts toward the prescribed time set into the timing mechanism 80 by the thumb wheels 86, for the duration of each telephone call.

However, in the present arrangement, each telephone call is weighted with a rate factor, by the rate code analyzer 100; that is, the rate code analyzer 100 is responsive to the keypad 30 for operating the timing mechanism 80, through varying the rate of operation of the oscillator 84, at a rate determined by the destination of the telephone call selected at the keypad 30. In this manner, the duration of the limited period during which the timing mechanism 80 permits telephonic communications, after the expiration of which limited period power to the telephone circuitry 50 is discontinued, so that the telephone circuitry 50 will be disabled and telephone 10 will become inoperative, is varied in accordance with the call rate applied to each telephone call. Thus, telephone 10 is activated and charged at a point of purchase with preset call rates for a predetermined use cycle and, upon reaching the end of the use cycle, the telephone 10 is rendered inoperative and is discarded.

For example, where telephone 10 is capable of being used for telephone calls in a local area at a first call rate, for out-of-area calls at a second call rate which is twice the first call rate, for long-distance calls at a third call rate which is three times the first call rate, and for international calls at a fourth call rate which is four times the first call rate, telephone 10 is charged initially with a use time of one hour of local telephone calls, as by setting the timing mechanism 80 for a maximum limited period of one hour. Upon selection of the telephone call destination at the keypad 30, the rate code analyzer 100 determines which of the four call rates is applicable to the selected telephone call destination and operates the oscillator 84 at a corresponding rate so that the timing mechanism 80 will count at a faster or slower rate, depending upon the applicable call rate. Thus, if all telephone calls are within the local calling area, the calls will be weighted with the first call rate and the telephone 10 will remain in operation for a total of one hour of telephone call time. If the telephone calls are all international telephone calls, the calls will be weighted with the fourth call rate and the telephone 10 will remain in operation for a total of fifteen minutes. Telephone calls placed in the various four areas will result in the application of corresponding call rates so that the duration of the limited period during which the telephone 10 can remain in operation is varied in accordance with the accumulated telephone call time, as weighted by the different call rates.

The arrangement of FIG. 8 includes a use-time indicator 102 having both an audio indicator 104, which applies an audible indication in the form of a muted buzzing sound to the earphone 42, and a visual indicator 106, which furnishes a visible indication, both the audible and visible indications advising that only a limited amount of use time, for example, five minutes, remains available.

Figure 9:
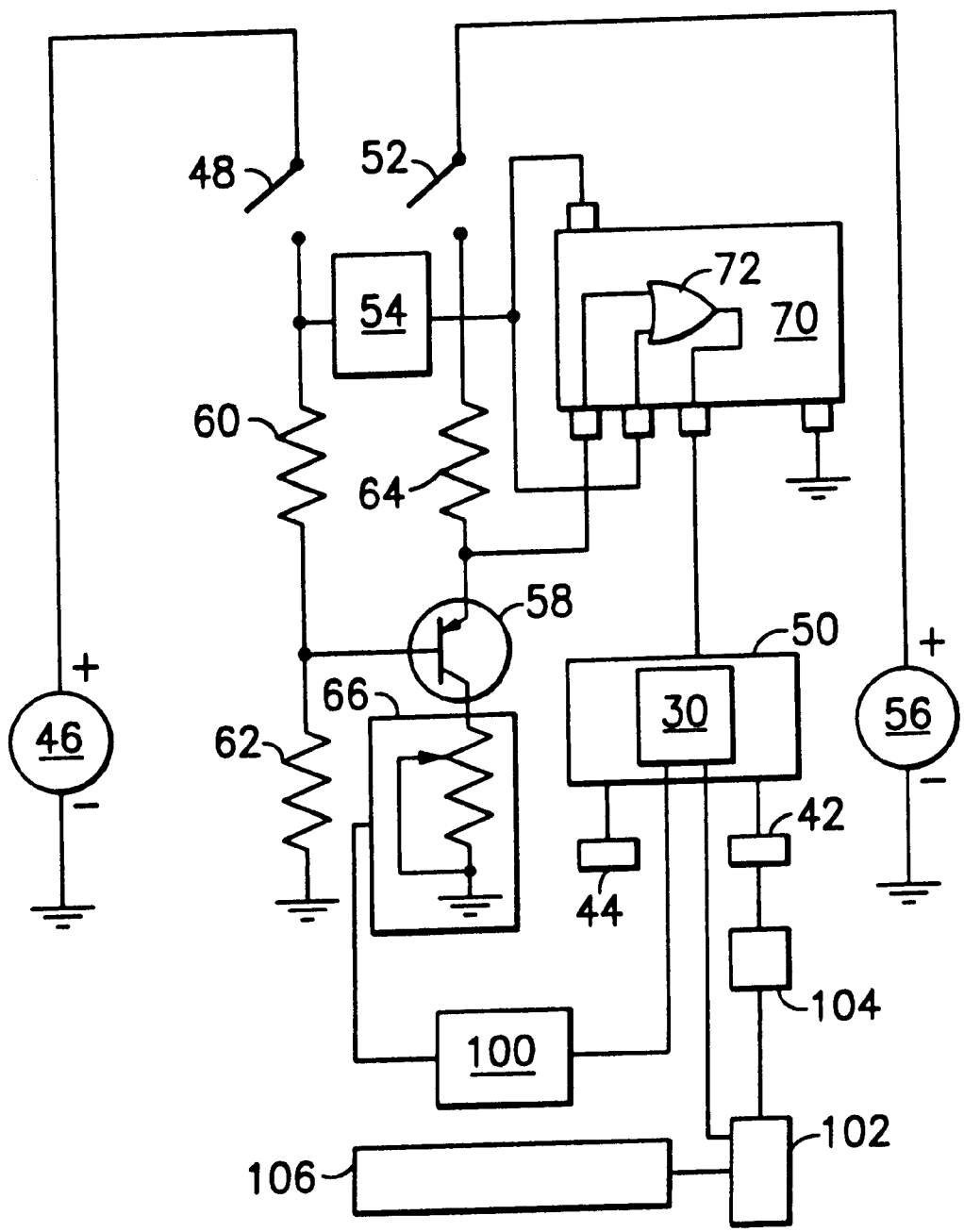
FIG. 9 is a schematic diagram showing a further alternate embodiment.

In the further alternate arrangement illustrated in FIG. 9, rate code analyzer 100 is placed in an arrangement similar to the arrangement described in connection with FIG. 6, so as to be responsive to the keypad 30 of the telephone circuitry 50 for operating the variable resistor 66 to draw current from the setting battery 56 at a rate determined by the destination of the telephone call selected at the keypad 30. Thus, the duration of the limited period provided by the life of the setting battery 56 is varied in accordance with the call rate applied to each telephone call, in a manner analogous to that described in connection with the arrangement of FIG. 8. As in the arrangement of FIG. 8, the alternate arrangement of FIG. 9 includes a use-time indicator 102 having an audio indicator 104 and a visual indicator 106.

In order to further simplify the distribution and use of telephones constructed in accordance with the present invention, preferably all of the telephones distributed from one particular source are provided with one common telephone number. A call signal transmitted from a telephone constructed in accordance with the invention preferably includes an intermittent encrypted code so that a connection is maintained throughout the course of a telephonic communication. Any unencrypted signal is dropped out within a very short time to prevent unauthorized use of the carrier signal service. In this manner the telephone and the use time is prepaid at the time of purchase of the telephone and there in no necessity for any complex real time use billing system, and the concomitant expensive computer tracking infrastructure currently employed for that purpose.

Figure 10:
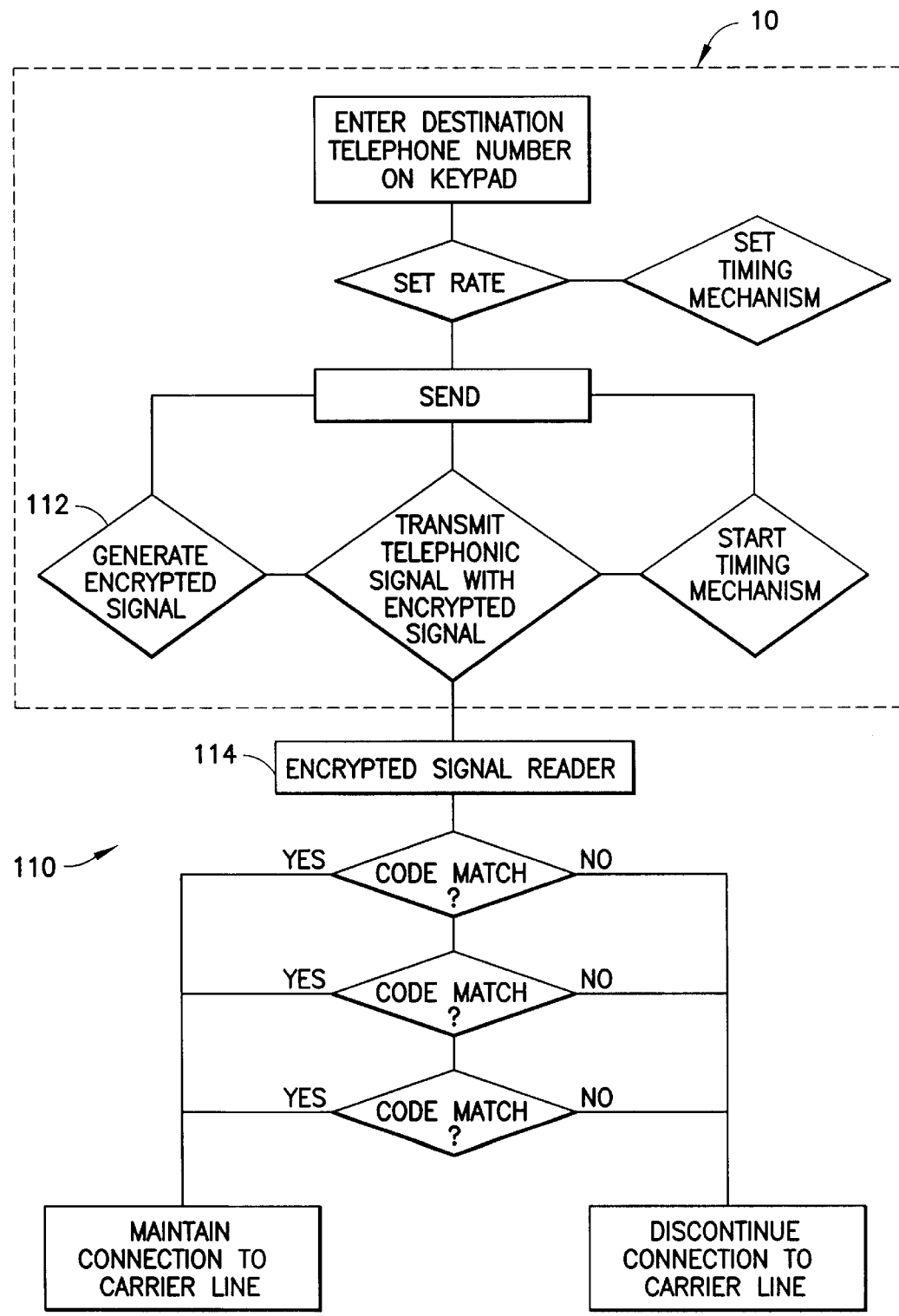
FIG. 10 is a schematic diagram illustrating a wireless telephone system constructed in accordance with the present invention.

As seen in FIG. 10, a telephone system 110 constructed in accordance with the present invention provides a wireless telephone, such as telephone 10 described above, with an encrypted signal means 112 for transmitting an encrypted signal during telephonic communications carried out through the wireless telephone. The telephone system 110 includes an encrypted signal reading means 114 remote from the telephone, preferably located at a carrier's facility. As long as an encrypted signal is present in the information transmitted by the telephone, the call connection to the carrier's line is maintained. In the absence of the encrypted signal, the call connection is discontinued, dropping the telephonic communication from the carrier's line. Since a "cloned" telephone number will not include the encrypted signal, unauthorized use of the assigned carrier frequency is precluded, and theft of airtime is deterred.

In the preferred arrangement, the encrypted signal is transmitted in multiple clusters, with a cluster being transmitted a few times each second. Any access frequency that does not carry the correct encryption hidden in a signal cluster is disconnected from the call carrier frequency, preferably within about a quarter of a second. In order to foil any complete cloning of an encrypted signal code from a partial signal scan, the encryption code can be mathematically infinite, batch specific, time graded and progressive, that is, the signal code can be changed over and over thereby providing a continually changing coded signal during the duration of a telephonic communication to preclude duplication of a complete signal code and further deter the theft of airtime.

Wireless telephone system 110 enables a reduction in cost by allowing the purchase from a carrier of bulk, prepaid, non-computer-tracked airtime. Current complex computer tracking infrastructures can be replaced with relatively simple and inexpensive airtime debit accounting systems. Telephones constructed in accordance with the present invention may be purchased at a relatively low price and made available at a very wide variety of sales outlets. In this manner, wireless telephones and wireless telephone services are made available to a much wider population for convenience as well as for emergency uses, with economy.

It will be seen that the present invention attains the several objects and advantages summarized above; namely: Simplifies and renders more economical the use of wireless telephone services; renders wireless telephone services available to a larger audience at lowered cost; facilitates the distribution and use of wireless telephones; reduces the expense of wireless telephones and wireless telephone services; promotes the use of wireless telephones and wireless telephone services by those who otherwise would not invest in a wireless telephone and expend funds for wireless telephone services; facilitates the availability of wireless telephones and wireless telephone services for emergency uses; provides added convenience in obtaining as well as using wireless telephones and wireless telephone services.

It is to be understood that the above detailed description of preferred embodiments of the invention is provided by way of example only. Various details of design, construction and procedure may be modified without departing from the true spirit and scope of the invention, as set forth in the appended claims.

The embodiments of the invention in which an exclusive property or privilege is claimed are defined as follows:

1. A wireless telephone system including a wireless telephone capable of use for telephonic communication only during a limited period, after which period the telephone is rendered inoperative for telephonic communication in the telephone system, the telephone comprising:

telephonic means for transmitting and receiving telephonic communications;

enabling/disabling means for enabling the telephonic means for telephonic communications during the limited period and disabling the telephonic means for telephonic communications upon expiration of the limited period, whereby the telephone is rendered inoperative beyond the limited period;

selective operating means for operating the telephonic means for the transmission of selected telephonic communications of selected durations, the enabling/disabling means being responsive to the selective operating means such that telephonic communication is disabled for telephonic communications when the sum of the selected durations reaches the limited period; and encrypted signal means for transmitting an encrypted signal at all times during the transmission of the selected telephonic communications through the telephonic means;

the telephone system including encrypted signal reading means remote from the telephone and responsive to a transmitted encrypted signal so as to maintain telephonic communication through the telephone system during transmission of the selected telephonic communications only when the transmitted encrypted signal is present and to discontinue telephonic communication through the telephone system upon any absence of the transmitted encrypted signal.

2. The telephone system of claim 1 wherein the encrypted signal means transmits multiple encrypted signal clusters within each second of the duration of each selected telephonic communication.

3. The telephone system of claim 1 wherein the encrypted signal means transmits a continually changing coded signal during the duration of each selected telephonic communication.

4. A wireless telephone for use in a telephone system including encrypted signal reading means remote from the telephone, the wireless telephone being capable of use for telephonic communication only during a limited period, after which period the telephone is rendered inoperative for telephonic communication in the telephone system, the telephone comprising:

telephonic means for transmitting and receiving telephonic communications;

enabling/disabling means for enabling the telephonic means for telephonic communications during the limited period and disabling the telephonic means for telephonic communications upon expiration of the limited period, whereby the telephone is rendered inoperative beyond the limited period;

selective operating means for operating the telephonic means for the transmission of selected telephonic communications of selected durations, the enabling/disabling means being responsive to the selective operating means such that telephonic communication is disabled for telephonic communications when the sum of the selected durations reaches the limited period; and encrypted signal means for transmitting an encrypted signal at all times during the transmission of telephonic communications through the telephonic means such that the encrypted signal reading means is responsive to the transmitted encryted signal to maintain telephonic communication through the telephone system during the transmission of the selected telephonic communications only when the transmitted encrypted signal is present and to discontinue telephonic communication through the telephone system upon any absence of the transmitted encrypted signal.

5. The telephone of claim 4 wherein the encrypted signal means transmits multiple encrypted signal clusters within each second of the duration of each selected telephonic communication.

6. The telephone system of claim 4 wherein the encrypted signal means transmits a continually changing coded signal during the duration of each selected telephonic communication.

7. A wireless telephone system including a wireless telephone capable of use for telephonic communication only during a limited period, after which period the telephone is rendered inoperative for telephonic communication in the telephone system, the telephone comprising:

telephonic means for transmitting and receiving telephonic communications, the telephonic means including a call destination selector for selecting the destination of a telephonic communication, the destination being selected from different rate destinations;

enabling/disabling means for enabling the telephonic means for telephonic communications during the limited period and disabling the telephonic means for telephonic communications upon expiration of the limited period, whereby the telephone is rendered inoperative beyond the limited period and is capable of being discarded;

selective operating means for operating the telephonic means for the transmission of selected telephonic communications of selected durations, the enabling/disabling means being responsive to the selective operating means such that telephonic communication is disabled for telephonic communications when the sum of the selected durations reaches the limited period;

the enabling/disabling means including setting means for determining a maximum duration of the limited period, and disabling means for rendering the telephonic means inoperative in response to the sum of the selected durations reaching the duration of the limited period;

the setting means including rate code means responsive to the call destination selector for operating the setting means at a rate determined by the selected destination of the telephonic communication to vary the duration of the limited period, up to the maximum duration, in accordance with the selected destination of the telephonic communication so as to enable telephonic communications to different rate destinations during the duration of the limited; and encrypted signal means for transmitting an encrypted signal at all times during the transmission of the selected telephonic communications through the telephonic means;

the telephone system including encrypted signal reading means remote from the telephone and responsive to a transmitted encrypted signal so as to maintain telephonic communication through the telephone system during transmission of the selected telephonic communications only when the transmitted encrypted signal is present and to discontinue telephonic communication through the telephone system upon any absence of the transmitted encrypted signal.

8. The invention of claim 7 wherein the setting means includes a source of power of given capacity, and the rate code means is responsive to the call destination selector for varying the rate of flow of current from the source of power in accordance with the selected destination of the telephonic communication.

9. The invention of claim 7 wherein the setting means includes a timing mechanism, and the rate code means is responsive to the call destination selector for varying the rate of operation of the timing mechanism in accordance with the selected destination of the telephonic communication.

10. A wireless telephone for use in a telephone system including encrypted signal reading means remote from the telephone, the wireless telephone being capable of use for telephonic communication only during a limited period, after which period the telephone is rendered inoperative for telephonic communication in the telephone system, the telephone comprising:

telephonic means for transmitting and receiving telephonic communications, the telephonic means including a call destination selector for selecting the destination of a telephonic communication, the destination being selected from different rate destinations;

enabling/disabling means for enabling the telephonic means for telephonic communications during the limited period and disabling the telephonic means for telephonic communications upon expiration of the limited period, whereby the telephone is rendered inoperative beyond the limited period and is capable of being discarded;

selective operating means for operating the telephonic means for the transmission of selected telephonic communications of selected durations, the enabling/disabling means being responsive to the selective operating means such that telephonic communication is disabled for telephonic communications when the sum of the selected durations reaches the limited period;

the enabling/disabling means including setting means for determining a maximum duration of the limited period, and disabling means for rendering the telephonic means inoperative in response to the sum of the selected durations reaching the duration of the limited period;

the setting means including rate code means responsive to the call destination selector for operating the setting means at a rate determined by the selected destination of the telephonic communication to vary the duration of the limited period, up to the maximum duration, in accordance with the selected destination of the telephonic communication so as to enable telephonic communications to different rate destinations during the duration of the limited; and encrypted signal means for transmitting an encrypted signal at all times during the transmission of telephonic communications through the telephonic means such that the encrypted signal reading means is responsive to the transmitted encryted signal to maintain telephonic communication through the telephone system during the transmission of the selected telephonic communications only when the transmitted encrypted signal is present and to discontinue telephonic communication through the telephone system upon any absence of the transmitted encrypted signal.

11. The invention of claim 10 wherein the setting means includes a source of power of given capacity, and the rate code means is responsive to the call destination selector for varying the rate of flow of current from the source of power in accordance with the selected destination of the telephonic communication.

12. The invention of claim 10 wherein the setting means includes a timing mechanism, and the rate code means is responsive to the call destination selector for varying the rate of operation of the timing mechanism in accordance with the selected destination of the telephonic communication.

13. A method of using a wireless telephone for telephonic communications in a wireless telephone system during only the duration of a limited period, after which period the telephone is rendered inoperative in the telephone system, the telephone including telephonic means for transmitting and receiving telephonic communications, the method comprising:

enabling the telephonic means for telephonic communications during the duration of the limited period;

operating the telephonic means for the transmission of telephonic communications of selected durations;

disabling telephonic communication through the telephonic means upon the sum of the selected durations reaching the duration of the limited period, whereby the telephone is rendered inoperative in the telephone system beyond the limited period;

transmitting an encrypted signal at all times during the transmission of telephonic communications through the telephonic means; and maintaining the telephonic communication through the telephone system during the transmission of the selected telephonic communications only when the transmitted encrypted signal is present and discontinuing telephonic communication through the telephone system upon any the absence of the transmitted encrypted signal.

14. The method of claim 13 including:

selecting the destination of a telephonic communication, the destination being selected from different rate destinations;

setting a maximum duration of the limited period; and varying the duration of the limited period, up to the maximum duration, in accordance with the selected destination of the telephonic communication so as to enable telephonic communications to different rate destinations during the duration of the limited period.

* * * * *